(12) United States Patent
Gibbs et al.

(10) Patent No.: US 11,068,270 B2
(45) Date of Patent: *Jul. 20, 2021

(54) APPARATUS AND METHOD FOR GENERATING AND PROCESSING A TRACE STREAM INDICATIVE OF INSTRUCTION EXECUTION BY PROCESSING CIRCUITRY

(71) Applicant: ARM LIMITED, Cambridge (GB)

(72) Inventors: Michael John Gibbs, Fulbourn (GB); John Michael Horley, Hauxton (GB)

(73) Assignee: ARM LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,620

(22) PCT Filed: Sep. 13, 2016

(86) PCT No.: PCT/GB2016/052819
§ 371 (c)(1),
(2) Date: Dec. 13, 2018

(87) PCT Pub. No.: WO2017/220950
PCT Pub. Date: Dec. 28, 2017

(65) Prior Publication Data
US 2019/0179642 A1 Jun. 13, 2019

(30) Foreign Application Priority Data

Jun. 24, 2016 (GB) ..................... 1611012

(51) Int. Cl.
*G06F 9/38* (2018.01)
*G06F 11/36* (2006.01)
(Continued)

(52) U.S. Cl.
CPC .......... *G06F 9/3806* (2013.01); *G06F 9/3005* (2013.01); *G06F 9/30181* (2013.01);
(Continued)

(58) Field of Classification Search
CPC . G06F 9/32–381; G06F 11/3471–3656; G06F 9/38–3814; G06F 11/3466–348; G06F 11/3636–3656
See application file for complete search history.

(56) References Cited

U.S. PATENT DOCUMENTS 6,055,630 A * 4/2000 D'Sa ..................... G06F 9/3802
712/203
6,622,240 B1 * 9/2003 Olson ................. G06F 9/30058
712/233
(Continued)

FOREIGN PATENT DOCUMENTS

| CN | 104866345 | 8/2015 |
| GB | 2 293 671 | 4/1996 |
| JP | 2019-509576 | 4/2019 |

OTHER PUBLICATIONS

Uzelac et al., Using Branch Predictors and Variable Encoding for On-the-Fly Program Tracing, published by IEEE Transactions On Computers, vol. 63, No. 4, Apr. 2014, pp. 1008-1020 (Year: 2014).*
(Continued)

*Primary Examiner* — S. Sough
*Assistant Examiner* — Zheng Wei
(74) *Attorney, Agent, or Firm* — Nixon & Vanderhye, P.C.

(57) ABSTRACT

An apparatus has an input interface for receiving instruction execution information from processing circuitry, and trace generation circuitry for generating from the instruction execution information a trace stream. The instruction sequence from the processing circuitry includes at least one branch-future instruction that effectively turns an instruction identified by the branch-future instruction into a branch, and in particular causes the processing circuitry to branch to a target address identified by the branch-future instruction when that identified instruction is encountered within the
(Continued)

instruction sequence. A branch control cache is used to store branch control information derived from the branch-future instruction, and the trace generation circuitry is arranged to detect, based on that branch control information, when the identified instruction has been encountered by the processing circuitry, and upon such detection to then issue within the trace stream a trace element to indicate that a branch to the target address has occurred.

27 Claims, 8 Drawing Sheets

(51) Int. Cl.
    *G06F 9/30*     (2018.01)
    *G06F 9/32*     (2018.01)
    *G06F 11/34*     (2006.01)

(52) U.S. Cl.
    CPC .............. *G06F 9/32* (2013.01); *G06F 9/3808* (2013.01); *G06F 11/3471* (2013.01); *G06F 11/3636* (2013.01); *G06F 11/3644* (2013.01); *G06F 11/3656* (2013.01)

(56) References Cited

U.S. PATENT DOCUMENTS

| | | | |
|---|---|---|---|
| 7,334,115 | B1 | 2/2008 | D'sa et al. |
| 9,430,245 | B2 * | 8/2016 | Rijshouwer ......... G06F 9/30058 |
| 2007/0283133 | A1 | 12/2007 | Williams et al. |
| 2010/0149185 | A1 | 6/2010 | Capewell et al. |
| 2013/0013849 | A1 | 1/2013 | Varma et al. |
| 2015/0006863 | A1 * | 1/2015 | McGowan .......... G06F 11/3636 712/227 |
| 2015/0058606 | A1 * | 2/2015 | Madampath .......... G06F 9/4484 712/236 |
| 2015/0106602 | A1 | 4/2015 | Greathouse et al. |

OTHER PUBLICATIONS

Jacobson et al., Trace Preconstruction, published by ACM 2000, pp. 37-46 (Year: 2000).*
Perleberg et al., Branch Target Buffer Design and Optimization, published by IEEE Transactions On Computers, vol. 42, No. 4, Apr. 1993, pp. 396-412 (Year: 1993).*
Driesen et al., "Accurate Indirect Branch Prediction", published by IEEE, pp. 167-178 (Year: 1998).*
Falcon et al., "Better Branch Prediction Through Prophet/Critic Hybrids" published by IEEE, pp. 80-89 (Year: 2005).*
International Search Report and Written Opinion of the ISA for PCT/GB2016/052819, dated Mar. 27, 2017, 14 pages.
Combined Search and Examination Report for GB1611012.4, dated Dec. 19, 2016, 9 pages.
Sherwood et al., "Patchable Instruction ROM Architecture", Cases, Nov. 16, 2001, pp. 24-33.
Anonymous, "nRF52-flash-patch/flash_patch.c at master • NordicSemiconductor/nRF52-flash-patch • GitHub", Apr. 19, 2016, retrieved Mar. 17, 2017, 3 pages.
Anonymous, "ARM DUI 0553A (ID121610) Cortex™-M4 Devices", Jan. 1, 2010, retrieved Mar. 17, 2017, 276 pages.
Office Action dated Nov. 13, 2020, issued in JP Application No. 2018-565866 with English translation, 9 pages.
Joseph Yui, ARM Cortex-M3, Jun. 15, 2009, pp. 249-259.

* cited by examiner

APPARATUS AND METHOD FOR GENERATING AND PROCESSING A TRACE STREAM INDICATIVE OF INSTRUCTION EXECUTION BY PROCESSING CIRCUITRY

This application is the U.S. national phase of International Application No. PCT/GB2016/052819 filed 13 Sep. 2016, which designated the U.S. and claims priority to GB Patent Application No. 1611012.4 filed 24 Jun. 2016, the entire contents of each of which are hereby incorporated by reference.

The present technique relates to mechanisms for generating a trace stream indicative of activities of processing circuitry within a data processing system, and in particular to mechanisms for generating and processing a trace stream indicative of instruction execution by such processing circuitry.

Trace circuitry can be used to produce a trace stream comprising a series of trace elements, such that those trace elements can later be analysed in order to determine activities of associated processing circuitry, for example to determine the sequence of instructions executed by the processing circuitry. To reduce the volume of trace information within the trace stream, the trace circuitry may be arranged not to produce a separate trace element for each instruction executed, but instead to only produce trace elements for certain predetermined instructions executed, for example generating a trace element for each branch instruction executed. From the information about the predetermined instructions, analysis circuitry can then seek to use a program image to reconstruct information about the sequence of instructions executed.

Recently, a new type of instruction has been proposed, which will be referred to herein as a branch-future instruction. A branch-future instruction can effectively change any arbitrary instruction into a branch.

This causes significant issues when seeking to trace the execution behaviour of processing circuitry using the trace stream approach described above, where trace elements are only produced for certain predetermined instructions. In particular, whilst the trace mechanism may be arranged to generate trace elements for each branch instruction, the use of the branch-future instruction enables arbitrary instructions (which the trace mechanism does not recognise as branch instructions) to initiate branches within the instruction flow, which can disrupt the ability of the analysis circuitry to correctly determine the instruction execution behaviour of the processing circuitry from the trace stream produced by the trace circuitry.

The present technique aims to improve reliable tracing in the presence of such branch-future instructions.

In one example configuration, there is provided an apparatus, comprising: an input interface to receive instruction execution information from processing circuitry indicative of a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; trace generation circuitry to generate from the instruction execution information a trace stream comprising a plurality of trace elements indicative of execution by the processing circuitry of predetermined instructions within said sequence; and a branch control cache to store branch control information derived from said branch-future instruction; the trace generation circuitry being arranged to detect, based on the branch control information stored in the branch control cache, when the identified instruction has been encountered by the processing circuitry, and to then issue within the trace stream a trace element to indicate that a branch to the target address has occurred.

In another example configuration, there is provided an apparatus, comprising: an input interface to receive a trace stream comprising a plurality of trace elements indicative of execution by processing circuitry of predetermined instructions within a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; decompression circuitry, responsive to each trace element, to traverse a program image from a current instruction address until a next one of the predetermined instructions is detected within said program image, and to produce from the program image information indicative of the instructions between said current instruction address and said next one of the predetermined instructions; and a branch control cache associated with said decompression circuitry; the decompression circuitry being responsive to detecting the branch-future instruction when traversing said program image, to store within the branch control cache branch control information derived from the branch-future instruction; the decompression circuitry being arranged, when detecting with reference to the branch control information that the identified instruction has been reached during traversal of the program image, to treat that identified instruction as the next one of said predetermined instructions.

In a yet further example configuration, there is provided a method of generating a trace stream indicative of instruction execution by processing circuitry, comprising: receiving instruction execution information from the processing circuitry indicative of a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; generating from the instruction execution information the trace stream comprising a plurality of trace elements indicative of execution by the processing circuitry of predetermined instructions within said sequence; storing, in a branch control cache, branch control information derived from said branch-future instruction; and detecting, based on the branch control information stored in the branch control cache, when the identified instruction has been encountered by the processing circuitry, and then issuing within the trace stream a trace element to indicate that a branch to the target address has occurred.

In a further example configuration, there is provided an apparatus, comprising: input interface means for receiving instruction execution information from processing circuitry indicative of a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; trace generation means for generating from the instruction execution information a trace stream comprising a plurality of trace elements indicative of execution by the processing circuitry of predetermined instructions within said sequence; and branch control cache means for storing branch control information derived from said branch-future instruction; the trace generation means for detecting, based on the branch control information stored in the branch control cache means, when the identified instruction has been encountered by the processing circuitry, and for then issuing within the trace stream a trace element to indicate that a branch to the target address has occurred.

In accordance with another example configuration, there is provided a method of processing a trace stream generated to indicate instruction execution by processing circuitry, comprising: receiving the trace stream comprising a plurality of trace elements indicative of execution by the processing circuitry of predetermined instructions within a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; traversing, responsive to each trace element, a program image from a current instruction address until a next one of the predetermined instructions is detected within said program image, and producing from the program image information indicative of the instructions between said current instruction address and said next one of the predetermined instructions; responsive to detecting the branch-future instruction when traversing said program image, storing within a branch control cache branch control information derived from the branch-future instruction; and when detecting with reference to the branch control information that the identified instruction has been reached during traversal of the program image, treating that identified instruction as the next one of said predetermined instructions.

In a yet further example configuration, there is provided an apparatus, comprising: an input interface means for receiving a trace stream comprising a plurality of trace elements indicative of execution by processing circuitry of predetermined instructions within a sequence of instructions executed by the processing circuitry, said sequence including a branch-future instruction that indicates an identified instruction following said branch-future instruction within said sequence, execution of the branch-future instruction being such that said identified instruction, when encountered in said sequence by the processing circuitry, causes the processing circuitry to branch to a target address identified by the branch-future instruction; decompression means for traversing, responsive to each trace element, a program image from a current instruction address until a next one of the predetermined instructions is detected within said program image, and for producing from the program image information indicative of the instructions between said current instruction address and said next one of the predetermined instructions; and branch control cache means for association with said decompression means; the decompression means, responsive to detecting the branch-future instruction when traversing said program image, for storing within the branch control cache means branch control information derived from the branch-future instruction; the decompression means, when detecting with reference to the branch control information that the identified instruction has been reached during traversal of the program image, for treating that identified instruction as the next one of said predetermined instructions.

The present technique will be described further, by way of example only, with reference to embodiments thereof as illustrated in the accompanying drawings, in which.

Figure 1:
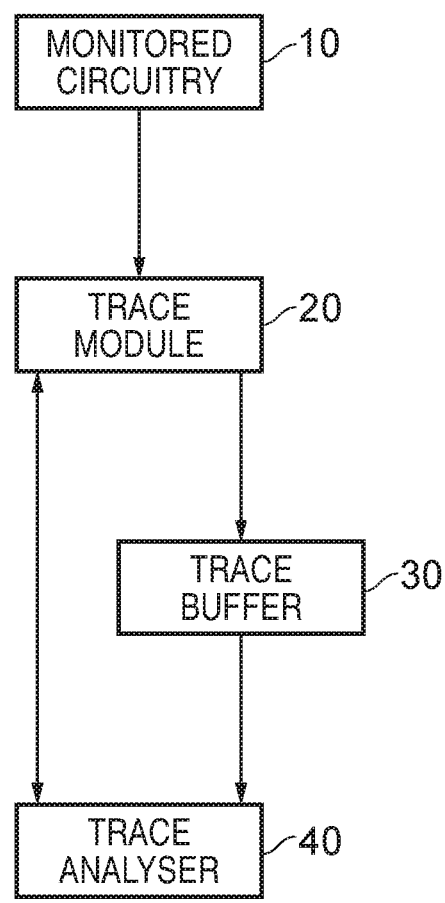
FIG. 1 is a block diagram of a system in accordance with one embodiment.
Figure 2:
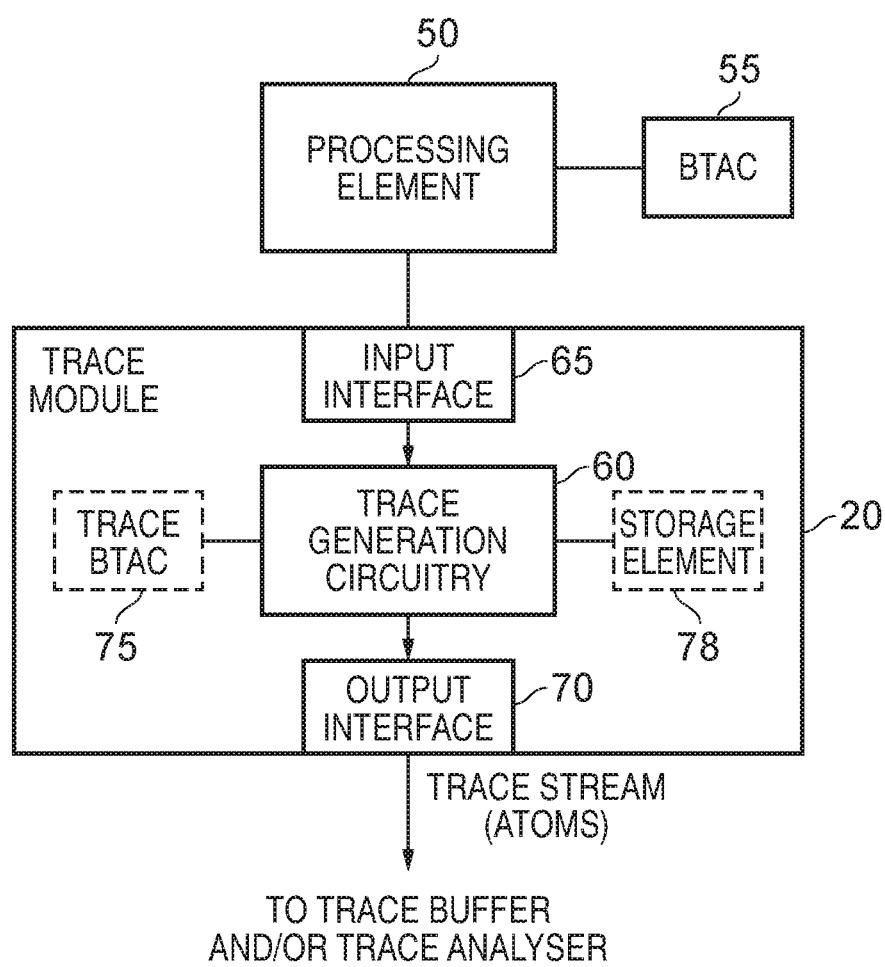
FIG. 2 is a block diagram illustrating in more detail a trace module used in accordance with one embodiment.
Figure 3:
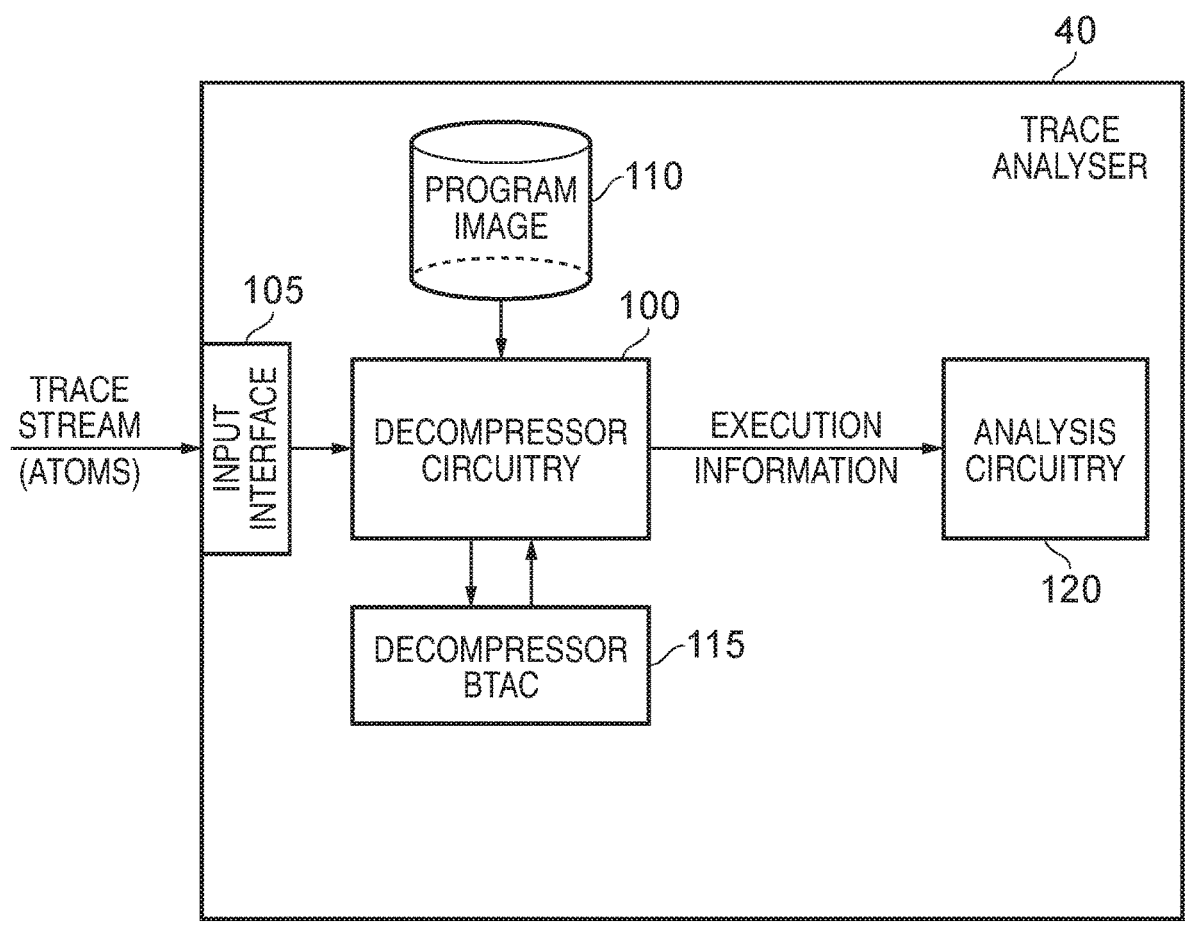
FIG. 3 is a block diagram illustrating in more detail trace analysis circuitry used in accordance with one embodiment.
Figure 4A:
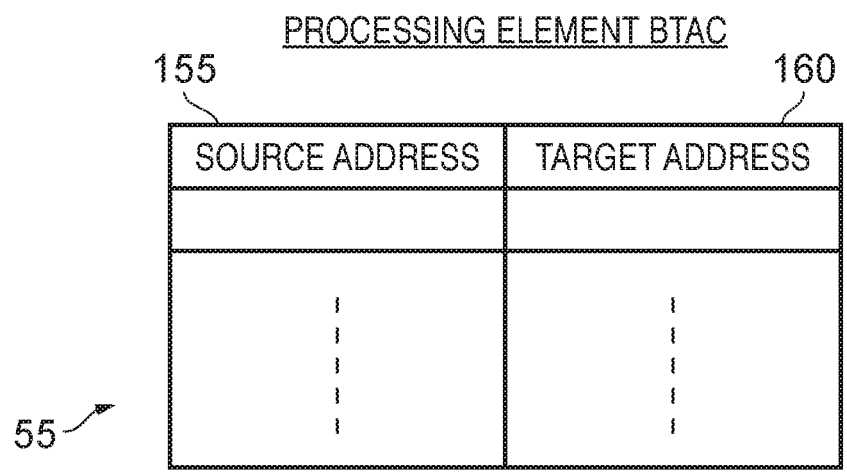
Figure 4B:
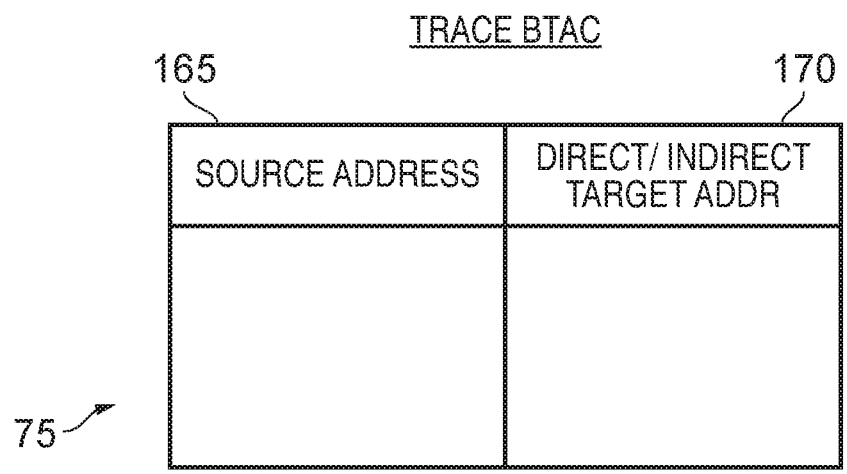
Figure 4C:
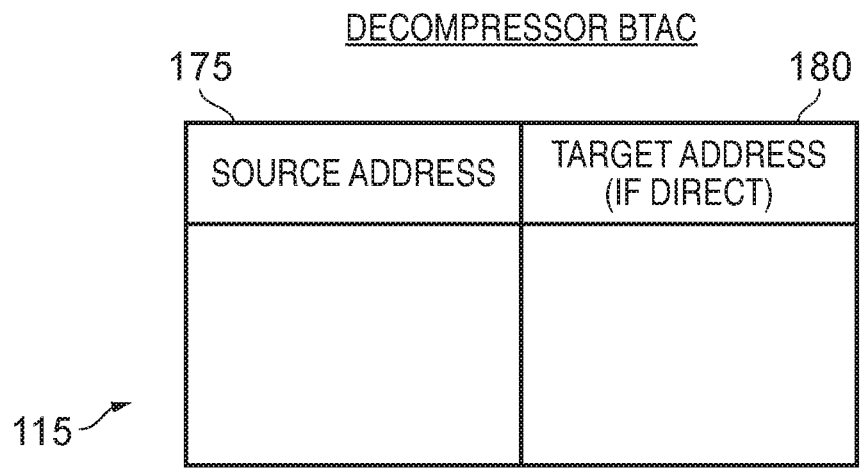
Figure 5:
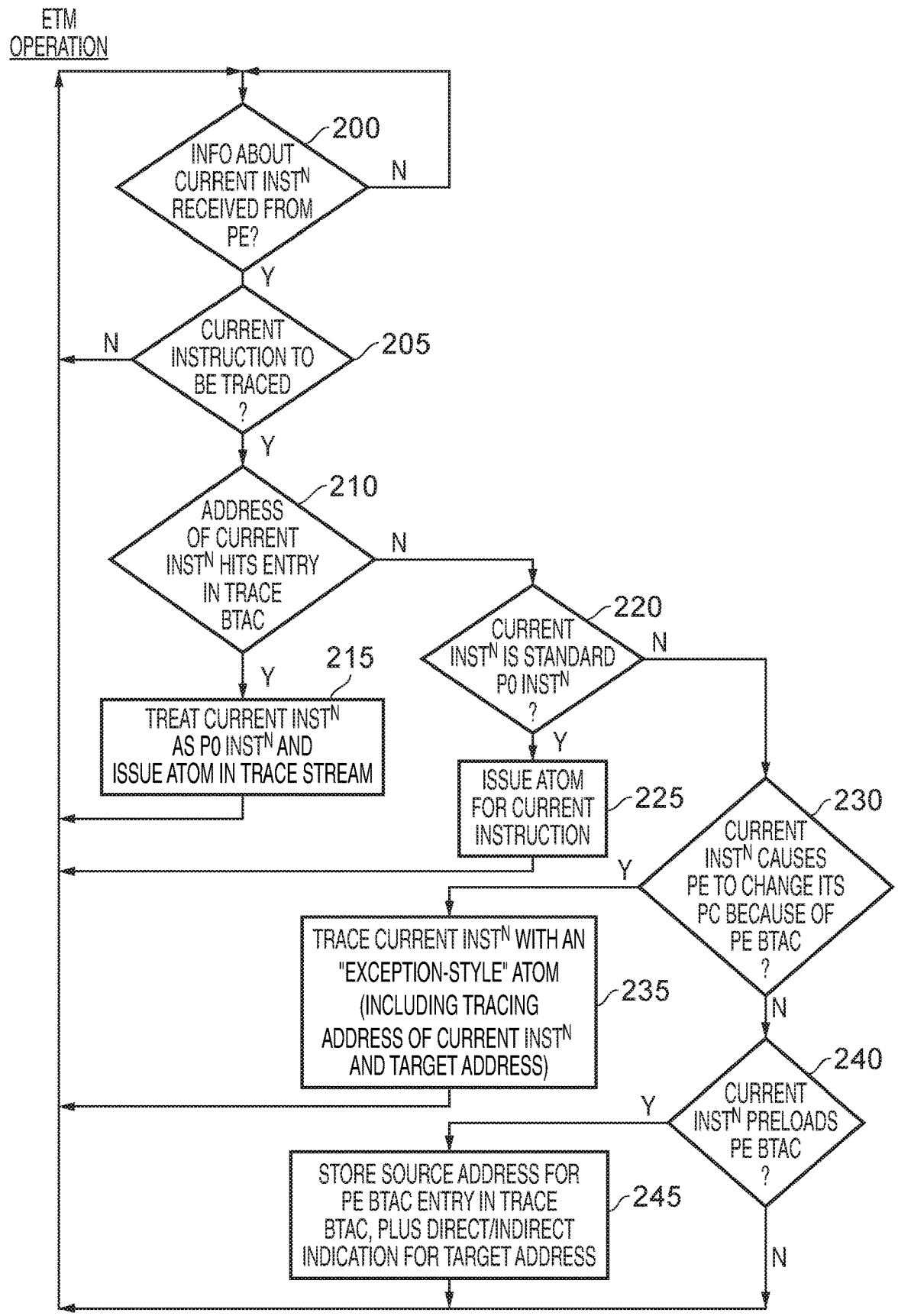
Figure 6:
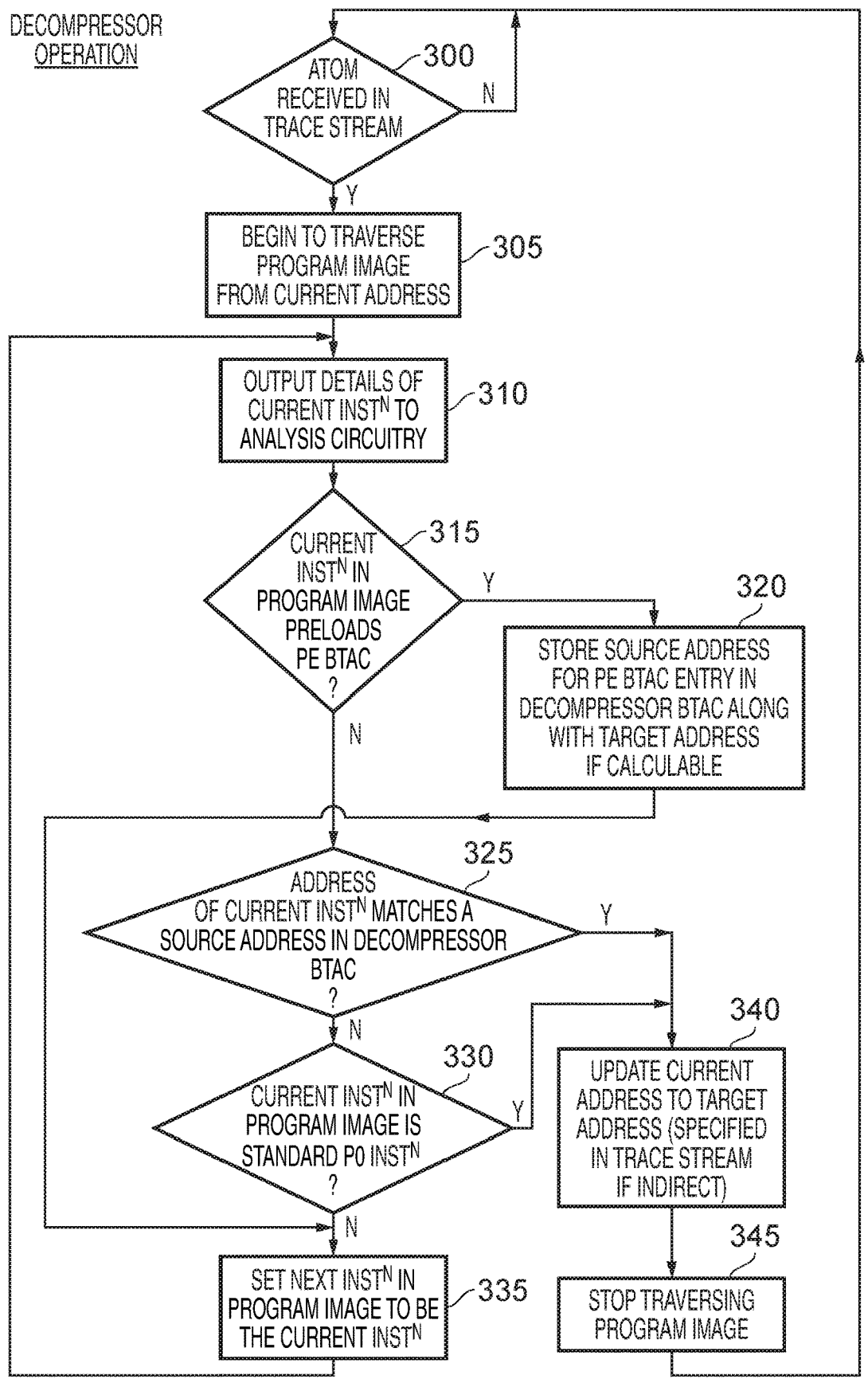
Figure 7:
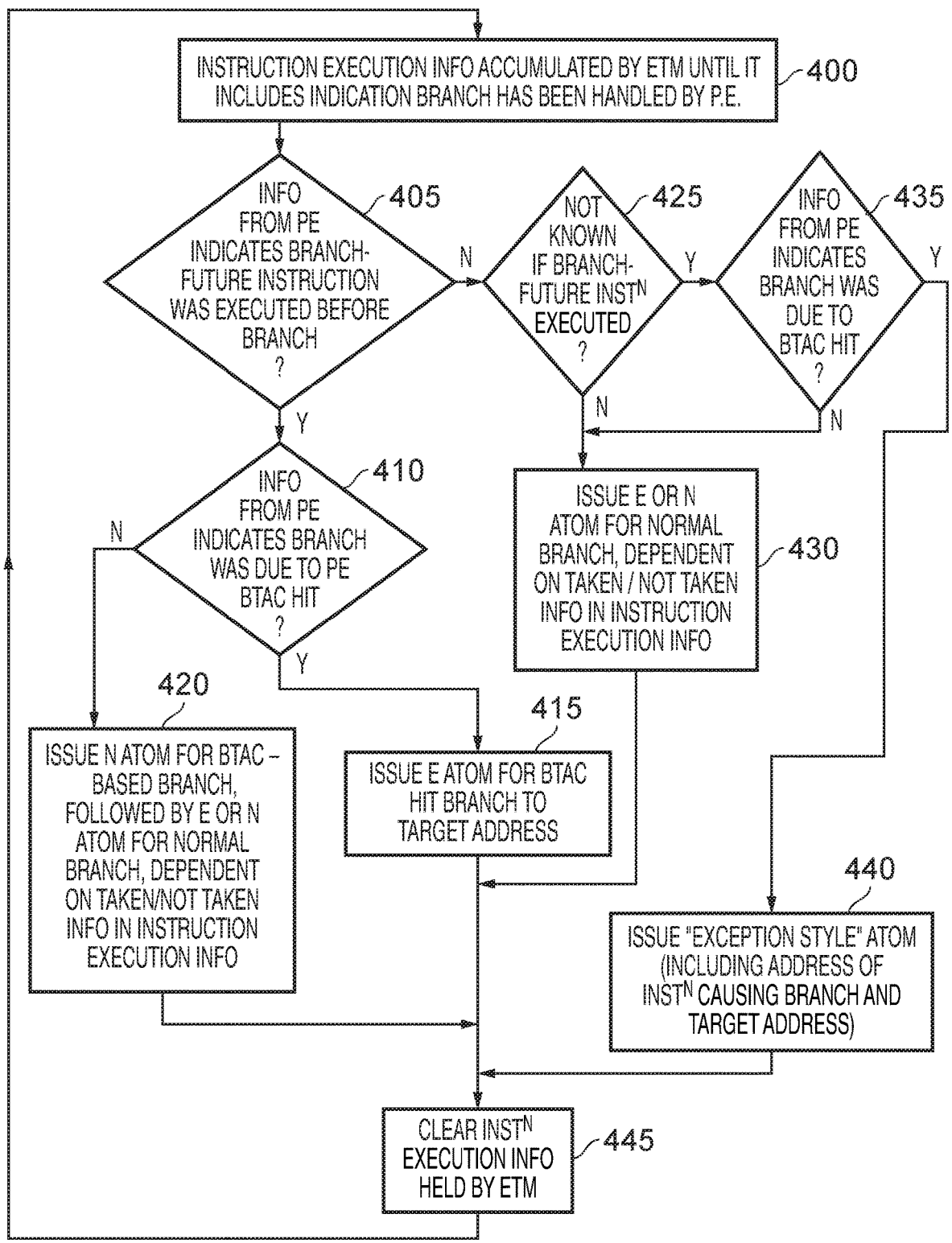
Figure 8:
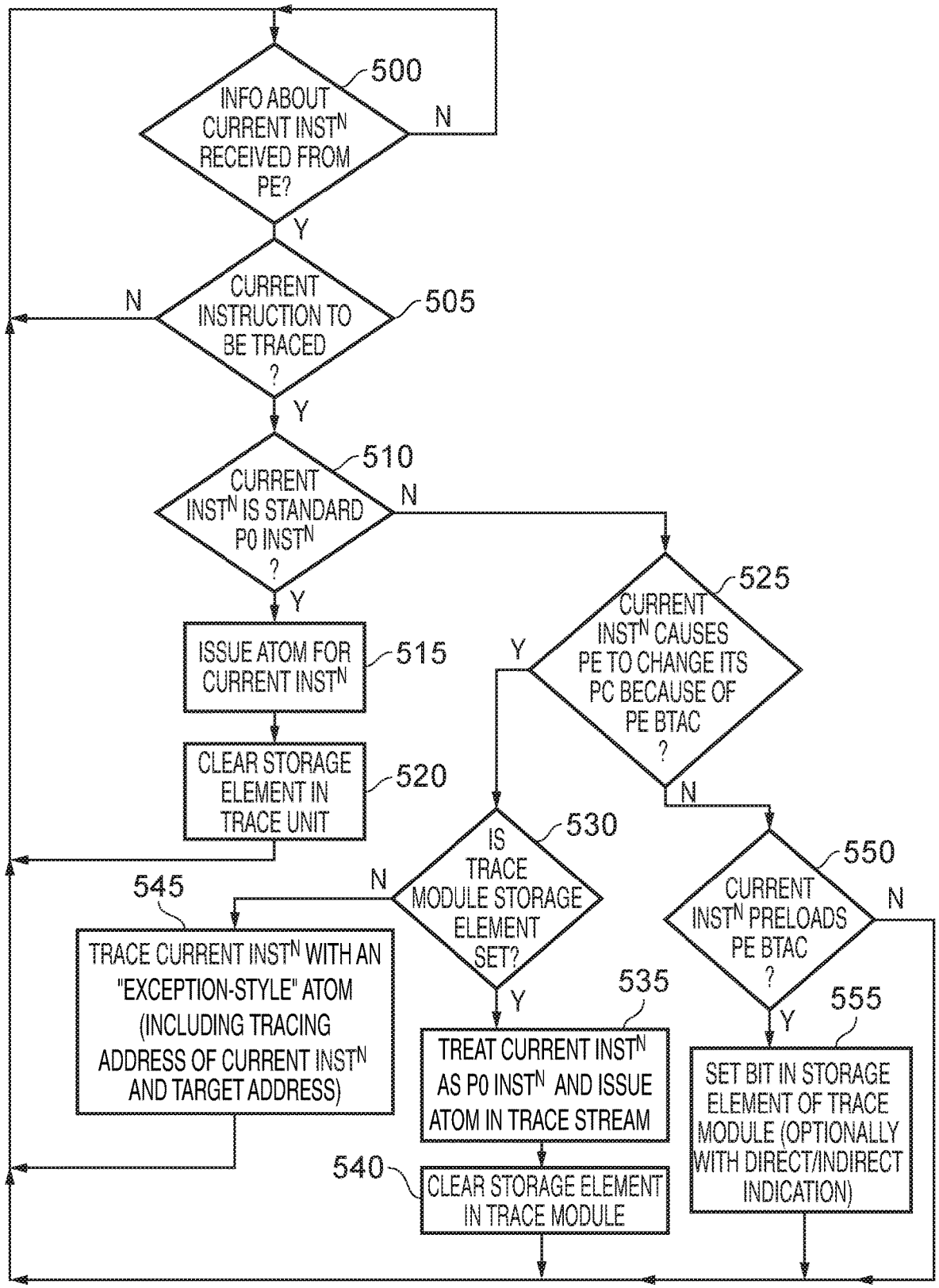

FIGS. 4A to 4C schematically illustrate different forms of branch target address cache (BTAC) that may be used within the system of FIG. 1 in accordance with one embodiment;

FIG. 5 is a flow diagram illustrating the operation of the trace module of FIG. 2 in accordance with one embodiment;

FIG. 6 is a flow diagram illustrating the operation of the decompressor circuitry of FIG. 3 in accordance with one embodiment;

FIG. 7 illustrates the operation of the trace module of FIG. 2 in an alternative embodiment where no trace BTAC is provided; and FIG. 8 illustrates the operation of the trace module of FIG. 2 in a yet further alternative embodiment where no trace BTAC is provided.

Tracing the activity of processing circuitry within a data processing system, whereby a stream of trace elements is generated which can then be analysed to identify the step-by-step activity of the processing circuitry is a highly useful tool in system development. The trace stream may for example be analysed in order to facilitate debugging of sequences of instructions being executed by the processing circuitry. Typically, the tracing mechanism are provided on-chip with the processing circuitry, an example of such an on-chip tracing mechanism being the Embedded Trace Macrocell (ETM) provided by ARM Limited, Cambridge, England in association with a variety of ARM processors. Such tracing mechanisms can potentially produce a large volume of trace elements that then need to be provided off-chip for further analysis. A number of techniques have been developed to seek to reduce the amount of trace information produced, whilst still enabling later analysis of the step-by-step activity of the processing circuitry.

As mentioned earlier, one technique for reducing the volume of trace information produced involves only outputting trace elements for particular types of instructions within the instruction sequence executed by the processing circuitry, with the trace analysis circuitry then being able to reconstruct the step-by-step instruction execution behaviour of the processing circuitry from information about the execution of those particular instructions. As an example, the trace circuitry may output a trace element each time a branch instruction is processed, indicating whether that branch has been taken or not taken, and the analysis circuitry can then deduce what instructions have been executed by the processing circuitry between those instructions for which a trace element has been produced.

A new type of instruction has been proposed, which will be referred to herein as a branch-future instruction. A branch-future instruction can be used to identify an instruction following the branch-future instruction within the instruction sequence, execution of the branch-future instruction causing the processing circuitry to then later branch to a target address identified by the branch-future instruction when that identified instruction is encountered within the instruction sequence. Hence, the branch-future instruction can effectively change any arbitrary instruction into a branch.

As mentioned earlier, this causes significant issues when seeking to trace the execution behaviour of processing circuitry using the trace stream approach described above, where trace elements are only produced for certain predetermined instructions. The described embodiments aim to alleviate these problems, allowing the reduced volume trace stream approach mentioned above to continue to be adopted whilst also accommodating instruction sequences including branch-future instructions.

Before discussing the embodiments with reference to the accompanying figures, the following description of embodiments is provided.

In one embodiment an apparatus is provided that comprises an input interface to receive instruction execution information from processing circuitry indicative of a sequence of instructions executed by the processing circuitry, and trace generation circuitry to generate from the instruction execution information a trace stream comprising a plurality of trace elements indicative of execution by the processing circuitry of predetermined instructions within the sequence. The sequence of instructions includes a branch-future instruction that indicates an identified instruction following the branch-future instruction within the sequence. Execution of the branch-future instruction by the processing circuitry causes the processing circuitry, when it subsequently encounters the identified instruction within the sequence, to branch to a target address identified by the branch-future instruction. Hence the identified instruction itself is not in that instance executed, but instead it is replaced by a branch to the target address identified by the branch-future instruction.

The apparatus includes a branch control cache for storing branch control information derived from the branch-future instruction. Further, the trace generation circuitry is arranged to detect, based on the branch control information stored in the branch control cache, when the identified instruction has been encountered by the processing circuitry, and to then issue within the trace stream a trace element to indicate that a branch to the target address has occurred.

Hence, in the above described embodiment, the trace generation circuitry can make use of the branch control information maintained in the branch control cache in order to detect when execution of the branch-future instruction has caused the identified instruction to be replaced by a branch, and to then issue a trace element within the trace stream to indicate that a branch to the target address has occurred. By incorporating such trace elements within the trace stream, in addition to the trace elements that the trace generation circuitry inserts when predetermined instructions within the sequence are executed by the processing circuitry (for example standard branch instructions), this enables trace analysis circuitry to later determine the flow of instructions executed by the processing circuitry, from the trace elements within the trace stream.

The branch control cache whose branch control information is used by the trace generation circuitry may be a branch control cache associated with the processing circuitry, in which event the processing circuitry may include, as part of the instruction execution information, an indication of when the processing circuitry has detected a hit in its branch control cache. However, in one embodiment the branch control cache that is used by the trace generation circuitry is actually a branch control cache associated with the trace generation circuitry, which in one embodiment may be provided separately to any branch control cache provided for the processing circuitry itself. In such an embodiment, the trace generation circuitry may be arranged to store the branch control information within its associated branch control cache dependent on the instruction execution information received from the processing circuitry. Hence, in such an embodiment, the trace generation circuitry has its own branch control cache in which to maintain appropriate branch control information to enable it to detect when the identified instruction has been encountered by the processing circuitry, and to then issue an appropriate trace element.

The manner in which the trace generation circuitry populates its associated branch control cache may vary dependent on embodiment. However, in one embodiment, when the instruction execution information indicates that the branch-future instruction has been executed by the processing circuitry, the trace generation circuitry is arranged to store, within the branch control cache, branch point data identified by the branch-future instruction and used to determine said identified instruction. The branch point data can take a variety of forms, but is sufficient to enable the identified instruction to be determined, and hence to enable the trace generation circuitry to detect when that identified instruction has been encountered by the processing circuitry.

In one embodiment, the branch point data may comprise one or more of: address data indicative of an address of said identified instruction; end data indicative of an address of a last instruction that immediately precedes said identified instruction; offset data indicative of a distance between said branch-future instruction and said identified instruction; a proper subset of bits indicative of a memory storage address of said identified instruction starting from a least significant bit end of bits of said memory storage address that distinguish between starting storage addresses of instructions; remaining size instruction data indicative of a number of instructions remaining to be processed before said identified instruction; and remaining size data indicative of a number of program storage locations remaining to be processed before said identified instruction is reached. It will be appreciated that these various options provide mechanisms for determining when the identified instruction has been reached within the instruction sequence. As mentioned earlier, when the processing circuitry reaches a point where it is about to execute that identified instruction, due to the earlier execution of the branch-future instruction it does not in fact execute that identified instruction, but instead at that point takes a branch to the target address identified by the branch-future instruction.

In one embodiment, the trace generation circuitry references the branch point data stored in its associated branch control cache in order to detect, from the received instruction execution information, when the identified instruction has been encountered by the processing circuitry, and upon that detection to then issue within the trace stream the trace element that indicates that a branch to the target address has occurred.

Irrespective to whether the trace generation circuitry stores the above-mentioned branch point data in its associated branch control cache, in one embodiment, when the instruction execution information indicates that the branch-future instruction has been executed by the processing circuitry, the trace generation circuitry is arranged to store, within the branch control cache, a target indicator indicating whether the target address is directly derivable from an immediate value specified within the branch-future instruction.

This target indicator information can be used by the trace generation circuitry when determining what information needs to be provided within the trace stream in association with the trace element that indicates that a branch to the target address has occurred. In particular, if the target indicator indicates that the target address is directly derivable from an immediate value specified within the branch-future instruction, then there is no need to provide any additional information about the target address, since typically the trace analysing circuitry will be provided with a program image of the program being executed by the processing circuitry, and hence can derive the target address. However in one embodiment, when the target indicator indicates that the target address is not directly derivable from the immediate value, the trace generation circuitry is arranged to issue within the trace stream, in association with the trace element to indicate that a branch to the target address has occurred, an indication of the target address derived from the instruction execution information received from the processing circuitry. In particular, based on the instruction execution information provided for the processing circuitry, the trace generation circuitry can determine the target address and then output an indication of that target address within the trace stream, so as to enable trace analysing circuitry to later determine the target address when analysing the trace stream.

In some instances, the trace generation circuitry may be arranged to trace all of the activities of the processing circuitry. However, in an alternative embodiment, the trace generation circuitry's operation may be selectively activated, so that only a portion of the instructions executed by the processing circuitry are actually traced. For example, trace may be turned on for instructions executed within a particular memory address range. In such an arrangement, the trace generation circuitry will then produce trace elements for those predetermined instructions within the sequence that actually fall within the address range being traced, and in addition will add further trace elements in situations where it detects from the branch control cache that an identified instruction identified by an executed branch-future instruction has been encountered by the processing circuitry (and is within the address range being traced). However, in one embodiment, the trace generation circuitry is arranged to store the branch control information within the branch control cache only when the associated branch-future instruction is within said portion (e.g. address range) of the sequence of instructions that is being traced. Accordingly, if the branch-future instruction is outside of the range of instruction for which trace is active, then the branch control cache will not be populated with an entry pertaining to that branch-future instruction.

As mentioned earlier, the branch control cache associated with the trace generation circuitry may be provided separately to a processing circuitry branch control cache that is used to maintain branch control information used by the processing circuitry to cause the processing circuitry to branch to the target address identified by the branch-future instruction when the identified instruction is encountered by the processing circuitry following execution of the branch-future instruction.

In one embodiment, if the processing circuitry branch control cache has only a single entry, and hence will only store branch control information derived from a single branch-future instruction, the contents of the branch control cache associated with the trace generation circuitry may be simplified. In particular, in such embodiments it may only be necessary for the branch control cache associated with the trace generation circuitry to store a target indicator indicating whether the target address is directly derivable from an immediate value specified within the single branch-future instruction, but there is no need to store branch point data used to determine the identified instruction. Instead, if the processing circuitry detects a hit in its processing circuitry branch control cache, and notifies the trace generation circuitry of that fact via the instruction execution information that it forwards to the trace generation circuitry, the trace generation circuitry will know that the hit is due to the same branch-future instruction that it has populated its branch control cache entry for, and hence can merely directly use the target indicator to determine what information, if any, needs to accompany the trace element that it will then issue to indicate that a branch to the target address has occurred. Such an approach can hence reduce the size requirements of the branch control cache to be associated with the trace generation circuitry.

As mentioned earlier, in some embodiments the trace generation circuitry may not trace the entire instruction sequence executed by the processing circuitry, but instead may be set up so as to only produce trace information for one or more portions of the instruction sequence being executed. In that instance, it is possible that a branch-future instruction may fall outside of the portions being traced, and hence may not cause an entry to be populated within the branch control cache associated with the trace generation circuitry. In such embodiments, it is then possible that the trace generation circuitry may receive instruction execution information indicating that the processing circuitry has branched to a target address due to encountering an identified instruction having associated branch control information in the processing circuitry's branch control cache, but the branch control cache associated with the trace generation circuitry may have no equivalent entry. In that instance, in one embodiment the trace generation circuitry is arranged to issue a trace element to identify both the identified instruction and the branch that has been taken on encountering that identified instruction.

This special form of trace element hence needs to capture more information than the earlier-mentioned trace element issued on detecting a hit in the trace generation circuit's associated branch control cache, since it is necessary to provide sufficient information within the trace element to both clearly identify the identified instruction, and to fully identify the branch that has been taken on encountering that identified instruction. Hence, in one embodiment that trace element will need to identify the address of the identified instruction, and the target address. Whilst this is expensive in terms of trace bandwidth, it will be appreciated that this special form of trace element is only required in the specific instance where there has been a hit in the processing circuit's branch control cache, but no equivalent hit detected in the trace generation circuit's branch control cache. In one embodiment, a pre-existing type of trace element format can be used for this special trace element, namely a format of trace element already used for providing information about exceptions that occur during instruction execution.

In one embodiment, the trace generation circuitry may be arranged to invalidate the branch control information in its associated branch control cache on occurrence of a predetermined trace control event. The predetermined trace control event can take a variety of forms. For example, it may be a synchronisation event or a "trace on" event that may be used to indicate exiting of a filtering state used to filter out some activities from being traced. Such events may represent a discontinuity in the tracing activities.

In some embodiments it is possible to not require a branch control cache to be provided in association with the trace generation circuitry. Instead, it may be sufficient to merely use the branch control cache associated with the processing circuitry to provide sufficient information to the trace generation circuitry to enable it to issue a trace element to indicate when a branch to the target address identified by a branch-future instruction has occurred.

In particular, in one such embodiment, the instruction execution information provided from the processing circuitry to the trace generation circuitry includes an indication when a branch-future instruction is executed by the processing circuitry, an indication when a branch has been handled by the processing circuitry, and an indication as to whether the handling of that branch was due to the branch control information maintained within the processing circuitry's branch control cache rather than due to execution of a branch instruction. When provided with this information, the trace generation circuitry can then determine the trace elements to be generated based on those indications within the instruction execution information, and in particular can still determine situations where it is necessary to issue a trace element to indicate that a branch to the target address identified by a branch-future instruction has occurred.

In particular, when the instruction execution information indicates that a branch-future instruction has been executed and a next branch that occurred was due to the branch control information, the trace generation circuitry may be arranged to generate said trace element to indicate that a branch to the target address has occurred.

Furthermore, in one embodiment, when the instruction execution information indicates that a branch has been handled due to execution of a branch instruction and was not preceded by execution of the branch-future instruction, the trace generation circuitry is arranged to issue a trace element whose type indicates whether the branch was taken or not taken by the processing circuitry.

A further situation that may arise is that the instruction execution information may indicate that a branch has been handled due to execution of a branch instruction, but that that was preceded by execution of a branch-future instruction. This could for example occur if a situation arose where the processing circuit's branch control cache had some or all of its contents invalidated at a point in time after the branch-future instruction had been executed, but prior to the identified instruction being encountered within the instruction sequence. In that instance, in one embodiment, the trace generation circuitry is arranged to generate a first trace element indicating that a branch to the target address has not occurred and a second trace element whose type indicates whether the branch handled due to execution of the branch instruction was taken or not taken by the processing circuitry. Hence, in this instance the trace generation circuitry still outputs a first trace element representative of the identified instruction having been encountered within the instruction sequence, but in this instance indicates that a branch to the target address has not occurred. This is then followed by a second trace element to represent the execution of the branch instruction, and in particular to indicate whether that branch was taken or not taken, the taken/not taken state being determined from the instruction execution information provided by the processing circuitry.

Such an approach ensures correct operation of the trace analyser circuitry of one embodiment. In particular as will be discussed later, the trace analyser circuitry is in one embodiment also provided with its own local branch control cache which it populates as and when branch-future instructions are encountered within the program image. Accordingly, by continuing to generate a trace element associated with the branch to the target address, but identifying that that branch did not occur, this ensures that the trace analyser correctly responds to the series of trace elements that it receives within the trace stream.

A yet further example scenario that can arise is when the instruction execution information indicates that the branch occurred due to the branch control information, but the trace generation circuitry does not have sufficient information to know whether a preceding branch-future instruction was executed by the processing circuitry. This could for example occur when only a subset of the activities of the processing circuitry are being traced, and the branch-future instruction is outside of that subset. In that instance, in one embodiment the trace generation circuitry is arranged to issue a trace element to identify both the identified instruction and the branch that has been taken on encountering that identified instruction. This trace element can take the same form as the earlier-mentioned special trace element, and hence may use a pre-existing exception-style format of trace element in order to capture all of the required information, in one embodiment this information including the address of the identified instruction and the target address.

In a yet further embodiment where the branch control cache is associated with the processing circuitry and is used to maintain branch control information used by the processing circuitry to cause the processing circuitry to branch to the target address identified by the branch-future instruction when said identified instruction is encountered by the processing circuitry following execution of the branch-future instruction, the trace generation circuitry may be arranged to have a storage element which is set when the instruction execution information indicates that the branch-future instruction has been executed by the processing circuitry. In addition, when the instruction execution information indicates that the processing circuitry has branched to the target address due to encountering an identified instruction having associated branch control information in the branch control cache, and the storage element is set, the trace generation circuitry is then arranged to issue within the trace stream a trace element to indicate that a branch to the target address has occurred and is further arranged to clear the storage element.

Hence, in this embodiment, the trace generation circuitry does not maintain a branch control cache itself, but has a simple storage element that is set or cleared as described above. This enables the trace generation circuitry to reliably issue a trace element when the processing circuitry branches due to a hit in the processing circuitry's branch control cache.

In one embodiment, when the instruction execution information indicates that the processing circuitry has branched to the target address due to encountering an identified instruction having associated branch control information in the branch control cache, and the storage element is not set, the trace generation circuitry is arranged to issue a trace element to identify both the identified instruction and the branch that has been taken on encountering that identified instruction. This trace element can take the same form as the earlier-mentioned special trace element, and hence may use a pre-existing exception-style format of trace element in order to capture all of the required information.

In one embodiment, when the instruction execution information indicates that a branch has been handled due to execution of a branch instruction, the trace generation circuitry is arranged to issue a trace element whose type indicates whether the branch was taken or not taken by the processing circuitry, and is further arranged to clear the storage element. Hence, when the trace generation circuitry is notified that a normal branch has occurred (i.e. not due to earlier execution of a branch-future instruction), the storage element is cleared.

In a further embodiment, an apparatus may be provided for performing trace analysing functions. In particular, such an apparatus may comprise an input interface to receive a trace stream comprising a plurality of trace elements indicative of execution by processing circuitry of predetermined instructions within a sequence of instructions executed by the processing circuitry. That sequence may include one or more of the earlier-mentioned branch-future instructions. The apparatus further includes decompression circuitry, that is responsive to each trace element to traverse a program image from a current instruction address until a next one of the predetermined instructions is detected within the program image. The decompression circuitry then produces from the program image information indicative of the instructions between the current instruction address and that next predetermined instruction that has been detected. The apparatus further has a branch control cache associated with the decompression circuitry, and the decompression circuitry is responsive to detecting a branch-future instruction when traversing the program image, to store within the branch control cache branch control information derived from the branch-future instruction. Further, the decompression circuitry is arranged, when detecting with reference to the branch control information that the identified instruction has been reached during traversal of the program image, to treat that identified instruction as the next one of the predetermined instructions.

Hence, considering the example where the predetermined instructions are branch instructions, then even though the identified instruction may not itself be a branch instruction, through use of the branch control cache in association with the decompression circuitry, the decompression circuitry can detect when that identified instruction is encountered within the program image, and at that point can treat the identified instruction as if it were a branch instruction. This hence allows the generation of a trace stream that only produces trace elements for certain instructions executed by the processing circuitry to be correctly analysed by the trace analysing circuitry, even when the instruction sequence being executed includes branch-future instructions, and hence can potentially turn any arbitrary instruction into a branch.

The information stored within the branch control cache associated with the decompression circuitry can take a variety of forms. In one embodiment, the decompression circuitry is arranged to store, as the branch control information, branch point data identified by the branch-future instruction and used to determine the identified instruction. Further, in one embodiment the decompression circuitry is arranged to store as the branch control information the target address when that target address is directly derivable from an immediate value specified within the branch-future instruction. Hence, if that target address is directly derivable from an immediate value, the decompression circuitry can determine the target address from the program image, and hence capture the target address within its local branch control cache. This enables it to directly determine where to branch to within a program image when the identified instruction is encountered. If instead the target address is not directly identifiable, then it will be appreciated from the earlier discussions that the trace stream will include information directly identifying the target address, and hence it is possible for the decompression circuitry to determine the target address from the information provided with the trace stream.

Particular embodiments will now be described with reference to the Figures.

FIG. 1 schematically illustrates a system in accordance with one embodiment, providing monitored circuitry 10, a trace module 20, a trace buffer 30 and a trace analyser 40. Whilst FIG. 1 illustrates a system providing a trace buffer 30, in alternative embodiments the trace module 20 may pass its output directly to the trace analyser 40, without going via a trace buffer. The trace module 20 is arranged to produce a trace stream comprising a series of trace elements, which then enables the trace analyser to reconstruct the activities of the monitored circuitry 10. The monitored circuitry 10 can take a variety of forms, but in one embodiment includes at least one processing element, for example a processor core, that is arranged to execute a sequence of instructions. The monitored circuitry outputs instruction execution information to the trace module 20 indicative of the instructions being executed on the monitored circuitry.

The trace module, which in one embodiment is embodied on-chip, and may for example take the form of an ETM circuit produced by ARM Limited, Cambridge, United Kingdom, is arranged to produce a trace stream providing a series of trace elements, where the trace elements are indicative of execution of predetermined instructions within the instruction sequence. Hence, rather than producing a trace element representative of each instruction that is executed by the monitored circuitry, the trace elements within the trace stream only indicate the execution of certain predetermined instructions, with the trace analyser being provided with sufficient knowledge (e.g. via a program image) to enable it to reconstruct information about the instructions that have been executed between each such predetermined instruction for which a trace element is provided. For example, in one embodiment the trace module may be arranged to generate a trace element for every branch instruction that is executed within the sequence, that trace element providing information about whether the branch was taken or not taken, and the trace analyser 40 is provided with a program image to enable it to determine, based on the information about the processing of the branch instructions, the actual sequence of instructions that has been executed. This enables a significantly reduced volume of trace elements to be produced. This is very useful, as the trace analyser 40 is typically embodied off-chip, and hence the trace stream needs to be routed via pins of the chip to the analyser.

The instruction sequence executed by the monitored circuitry may include a branch-future instruction. A branch-future instruction is able to identify any arbitrary instruction following the branch-future instruction, and when that identified instruction is then later encountered, this may cause the monitored circuit to not execute that identified instruction, but instead to take a branch to a target address that is identified by the branch-future instruction. To support this behaviour, in one embodiment the monitored circuitry may have an associated branch target address cache (BTAC) having one or more entries. When a branch-future instruction is executed, an entry is allocated in the BTAC, and that entry records as a source address the address of the identified instruction that is indicated by the branch-future instruction, along with a target address identifying the address to which the processing circuitry should branch when that identified instruction is encountered. In one embodiment, following the execution of the branch-future instruction, and the population of the BTAC in the above manner, when the processing circuitry then detects a hit in one of the entries of its BTAC, due for example to detecting that its program counter has been updated to, or is about to be updated to, a value corresponding to the source address held in one of the entries of the BTAC, it does not then execute the identified instruction at that address, but instead causes the instruction flow to branch to the target address also captured in that entry of the BTAC.

By such an approach, it can be seen that a branch-future instruction can be used to effectively turn any arbitrary instruction into a branch. The form of that identified instruction does not matter, since when identified by the branch-future instruction in the manner described above, the processing circuitry does not in fact execute that identified instruction, but instead performs the branch identified by the branch-future instruction. Branch-future instructions can be executed conditionally if desired. Hence, when the conditions for execution of the branch-future instruction are met, the above discussed processing will occur, and when the identified instruction is subsequently encountered the monitored circuitry will perform the branch to the target address rather than execute the identified instruction. Conversely, if the conditions are not met at the time the branch-future instruction is to be executed, the branch-future instruction will not be executed, and in due course the identified instruction will be executed in its normal manner to perform the functions specified by that identified instruction.

Whilst the use of such branch-future instructions adds significant flexibility into the operations that may be performed by the monitored circuitry, it causes significant issues for the trace module 20 when the trace module is arranged to produce a trace stream of the earlier-mentioned type, where trace elements are only produced for particular predetermined instructions within the sequence being executed by the monitored circuitry. In particular, if the trace module is set up to produce trace elements for each branch instruction executed, it would not typically produce a trace element for an identified instruction that has been flagged by the branch-future instruction as causing a branch, since that identified instruction may well itself not be a branch instruction. If the trace stream does not correctly flag that such a branch has occurred, it will be appreciated that the trace analyser will not be able to correctly deduce the sequence of instructions executed by the monitored circuitry.

It may be possible to arrange the trace generation circuitry to trace any such branch that occurred as a result of reaching an identified instruction flagged by an entry in the monitored circuit's BTAC in the same way as it might trace information about when an exception has occurred. However, this would be expensive in terms of trace bandwidth as it would be necessary to trace both the address of the identified instruction and the target address that was branched to, and hence this could significantly compromise the efficiency of the trace stream format.

As will be discussed further therein, a mechanism is provided to enable the trace generation circuitry to efficiently trace branches that take place within the monitored circuitry due to identified instructions being encountered that match entries in the monitored circuit's BTAC, due to previous execution of branch-future instructions.

FIG. 2 is a block diagram illustrating the trace module 20 of one embodiment. As shown, the trace module 20 is coupled to a processing element 50, which in one embodiment forms at least part of the monitored circuitry 10. The processing element 50 has an associated BTAC 55 that maintains branch control information that is populated on execution of each branch-future instruction. The BTAC 55 has one or more entries, and each time the processing element 50 executes a branch-future instruction, one of the entries in the BTAC 55 is populated with certain branch control information. In particular, in one embodiment as shown in FIG. 4A, each entry within the BTAC 55 may include a source address field 155 in which the address of the identified instruction indicated by the branch-future instruction is captured, and a target address field 160 in which the target address identified by the branch-future instruction is stored. Whilst, in one embodiment, a field 155 stores the address of the identified instruction, more generally the field 155 stores branch point data which can take any of the forms discussed earlier, but is sufficient to enable the processing element to detect when it has encountered within the instruction stream the identified instruction. Whenever a hit is detected in one of the entries of the BTAC 55, indicating that an identified instruction has been encountered within the instruction stream, that identified instruction is not executed, but instead the processing element branches to the target address in the associated target address field 160.

As the processing element 50 executes the sequence of instructions, it passes instruction execution information to the input interface 65 of the trace module 20, from where it is forwarded to the trace generation circuitry 60. The trace generation circuitry 60 may optionally have an associated trace BTAC 75 in which it stores certain branch control information that is derived from the instruction execution information received via the input interface 65. In one embodiment, the trace BTAC 75 takes the form shown in FIG. 4B, and comprises one or more entries, where each entry has a field 165 for storing as a source address the address of an identified instruction (or any other equivalent branch point data as discussed earlier) that is indicated by a branch-future instruction that has been executed by the processing element. Further, for each such entry, a further field 170 is provided that identifies whether the target address is directly determinable from the branch-future instruction, for example by being provided as an immediate value within the branch-future instruction. If instead the branch-future instruction identifies a register whose contents are used to derive the target address, then it is considered that the target address is an indirect target address, and it is flagged in the field 170 that the target address is not direct, i.e. is indirect. It is not necessary within the trace BTAC to actually capture the target address itself.

In one embodiment, an entry is made in the trace BTAC 75 irrespective of whether any condition codes associated with execution of the branch-future instruction have been satisfied.

The trace module 20 may be arranged to invalidate its trace BTAC 75 contents upon occurrence of one or more predetermined trace control events. Those trace control events can take a variety of forms, but may for example be a synchronisation event or a "trace on" event that exits a predetermined trace filtering operation, and hence which provide a discontinuity in the trace. This hence ensures that no out-of-date information is maintained within the trace BTAC 75.

As will be discussed later, in some embodiments it may not be necessary for the trace BTAC to have the field 165, and instead it may only be necessary to capture the direct/indirect nature of the target address within the field 170. Further, as will be discussed with reference to the embodiment of FIGS. 7 and 8, in some instances the trace module 20 may not need to separately maintain a trace BTAC 75, and instead the information provided from the processing element 50 indicative of its interaction with its local BTAC 55 may be sufficient to enable the trace generation circuitry 60 to generate the required trace elements. In the embodiment discussed later with reference to FIG. 8, the trace module maintains a small storage element 78 whose content is set and cleared in the manner discussed in FIG. 8.

In one embodiment, the trace generation circuitry 60 is arranged to output a trace element within its trace stream whenever a branch instruction is executed within the instruction sequence, that trace element also indicating whether the branch was taken or not taken, this being derivable from the instruction execution information received from the processing element 50 via the input interface 65. The stream of trace elements is then forwarded via the output interface 70 for onward propagation to the trace buffer 30 and/or the trace analyser 40. Each trace element may also be referred to herein as an "atom".

In addition, the trace generation circuitry is arranged to detect based on the branch control information stored in its local trace BTAC 75 (or in some embodiments based on the BTAC hit information forwarded by the processing element 50 indicative of hits that have occurred in the processing element's local BTAC 55) when an instruction identified by an executed branch-future instruction has been encountered by the processing element 50. In that instance, the trace generation circuitry also issues within the trace stream a trace element to indicate that a branch to the target address has occurred. The target address itself does not need to be identified within the trace stream if it is directly deducible from the branch-future instruction, since the trace analyser 40 will then be able to determine the target address. However, if the target address is not directly deducible, then the trace generation circuitry 60 will determine the target address from the information provided by the processing element 50, and will output the target address within the trace stream, so that that target address can then be used by the trace analyser 40.

FIG. 3 is a diagram schematically illustrating the trace analyser 40 of one embodiment. The trace analyser 40 receives the trace stream (series of atoms) at its input interface 105, from where that information is then forwarded to decompressor circuitry 100. The decompressor circuitry 100 has access to a program image 110 providing a copy of the program code executed by the monitored circuitry. The decompressor circuitry 100 keeps track of a current address within the program image (the current address being set to a predetermined initial value at predetermined points, such as when trace is turned on), and each time a new atom is received, it the traverses the program image until it reaches a next instruction within the program image that is of a particular type, e.g. a branch instruction in the above example where each trace element within the trace stream is indicative of execution of a branch instruction. The decompressor circuitry extracts from the program image information about each of the instructions executed between the current address and the address of that next predetermined instruction, and outputs all of that execution information to the analysis circuitry 120 for analysis. Once that next predetermined instruction has been encountered in the program image, the current address is then updated based on the target address of that encountered branch, so that when the next atom is received in the trace stream, the same program image traversal process can begin again, starting from the new current address.

As mentioned earlier, in addition to standard branch instructions, the trace stream will also include trace elements that have been inserted when the trace module 20 has detected that a branch to a target address has occurred due to an identified instruction indicated by a branch-future instruction having been encountered by the monitored circuitry. To enable the decompressor circuitry 100 to perform an appropriate traversal of the program image in such instances, the decompressor circuitry also has an associated local BTAC, referred to in FIG. 3 as the decompressor BTAC 115. When the decompressor circuitry 100 traverses the program image 110, as and when it encounters a branch-future instruction it then stores within the decompressor BTAC 115 branch control information derived from that branch-future instruction. In one embodiment, the decompressor BTAC takes the form shown in FIG. 4C, and comprises one or more entries, where each entry has a field 175 for storing as a source address the address of the instruction identified by the branch-future instruction (or any other equivalent branch point data as discussed earlier), and also has a field 180 for storing the target address if that target address is directly determinable from the branch-future instruction. In particular, in that event, the decompressor circuitry 100 will be able to determine the target address directly from the contents of the program image, and accordingly captures that target address within the field 180. If the target address is not directly determinable, the field 180 is left blank, and instead the decompressor circuitry will later determine the target address from information provided within the trace stream.

With the decompressor BTAC 115 populated in the above described manner, the decompressor circuitry 100 is then able to reference the decompressor BTAC 115 as its traverses the program image. Whenever it detects from the address of the current instruction being considered within the program image that there is a hit with the source address information in one of the entries of the decompressor BTAC 115, it determines that that currently considered instruction is an identified instruction that has been identified by a branch-future instruction, and hence treats that identified instruction as the next predetermined instruction rather than waiting until it reaches the next branch instruction. At that point the decompressor circuity 100 can provide to the analysis circuitry 120 information about all of the instructions traversed during the current traversal of the program image, and can also at that point update the current address to the target address. For a direct target address, that will be the target address indicated within the field 180 of the relevant entry within the decompressor BTAC 115, whilst for an indirect target address, that target address information will be provided directly within the trace stream in association with the atom that is currently being considered.

In the same way as discussed earlier for the BTAC 75 of the trace module 20, the trace analyser 40 may be arranged to invalidate its decompressor BTAC 115 contents upon occurrence of one or more predetermined trace control events, to hence ensure that no out-of-date information is maintained within the decompressor BTAC 115.

FIG. 5 is a flow diagram of a process that may be performed by the trace module 20 of FIG. 2 in accordance with one embodiment. At step 200, information about a current instruction being executed by the monitored circuitry is awaited, and once that information is received it is routed via the input interface 65 to the trace generation circuitry 60, where at step 205 the trace generation circuitry determines whether that current instruction is to be traced. Whilst in some embodiments it may be decided that the entire instruction sequence is to be traced, in other embodiments the trace mechanism may be selectively turned on and off dependent on the instructions currently being executed. This enables particular portions of the code to be traced, whilst other portions are not traced. In such embodiments, a trace stream will only be produced relating to those portions of the code that are to be traced, and using the earlier described mechanism the actual trace elements/atoms will then only relate to certain instructions executed within those portions, so that the trace analyser circuitry can then reconstruct information about the other instructions within those portions.

If it is determined at step 205 that the current instruction is not to be traced, then the process merely returns to step 200 to await information about the next instruction executed by the monitored circuitry.

When it is determined at step 205 that the current instruction is to be traced, then at step 210 the trace generation circuitry determines whether the address of the current instruction hits an entry in the trace BTAC 75. If it does, then this indicates that the current instruction is an identified instruction that has been identified by an earlier executed branch-future instruction, and hence should be treated as though it is a branch. Accordingly at step 215 that current instruction is treated as a branch instruction and an atom is issued in the trace stream.

In one embodiment, the predetermined instructions that the trace generation circuitry is arranged to issue trace atoms for are referred to as "P0 instructions", and in one embodiment an example of a P0 instruction is a branch instruction. It is possible that other types of instructions may also be considered to be P0 instructions, and will accordingly cause corresponding atoms to be issued in the trace stream. Whilst an instruction identified by a branch-future instruction will not necessarily itself be a P0 instruction, due to the hit in the trace BTAC 75 it is treated as though it is a P0 instruction and an appropriate atom for a P0 instruction is accordingly issued in the trace stream at step 215. If the direct/indirect target address field 170 of the relevant entry in the trace BTAC 75 indicates that the target address is directly determinable from the branch-future instruction, then no target address information needs to be output in the trace stream. Further, no source address information needs to be output, since at this point the current instruction is merely treated as a P0 instruction, and all that is required is a simple atom to identify that a P0 instruction has been executed. In one embodiment, such an atom is referred to as "E" atom. This hence provides a very efficient encoding to identify that a branch has occurred.

If the field 170 of the relevant entry of the trace BTAC indicates that the target address is an indirect target address, then the trace generation circuitry will determine the target address from the instruction execution information provided by the processing element 50, and an indication of that target address will follow the E atom within the trace stream so that that target address is later available to the trace analyser 40. Following step 215, the process then returns to step 200 to await information of the next instruction executed by the processing element 50.

If at step 210 it is determined that the address of the current instruction does not hit an entry in the trace BTAC 75, it is determined whether the current instruction is a standard P0 instruction, for example a standard branch instruction. If it is, then at step 225 a standard atom for such a P0 instruction is issued within the instruction stream. Considering a branch instruction, the instruction execution information will identify whether the branch was taken or not taken when that branch instruction was executed, and this information can be represented in the atom issued at step 225. In particular, the earlier mentioned "E" atom is issued if the branch was taken, whereas if the branch was not taken an "N" atom is issued. Hence, the presence of the atom itself identifies that a P0 instruction has been encountered, and the E/N flavour of that atom identifies whether the branch was taken or not taken. It will be appreciated with reference to the earlier step 215 that when a hit is detected in the trace BTAC, and accordingly the current instruction is treated as a P0 instruction, it is known that a branch is taken, since the execution of the earlier branch-future instruction will cause the processing circuitry to branch to the target address, and hence at step 215 the atom generated will always be an E atom.

In the same way as discussed earlier with reference to step 215, at step 225 there is no need to issue any target address information if the target address is directly derivable from the branch instruction. However, if it is not directly derivable, the trace generation circuitry determines the target address and will output an indication of that target address within the trace stream in association with the E/N atom. The process then returns to step 200.

If it is determined at step 220 that the current instruction is not a standard P0 instruction, then at step 230 it is determined whether the current instruction has caused the processing element to change its program counter because of a hit in the processing element's BTAC 55. This could for example arise due to trace filtering operations, where only a subset of the instructions of the processing element are traced. If the relevant earlier branch-future instruction was outside of that subset of instructions that are traced, no information about that branch-future instruction will have been captured in the trace BTAC 75 and hence the "no" path from step 210 will have been followed. If, nonetheless, at step 230 it is determined that a branch has occurred in the processing element due to a hit in its BTAC 55, then the process proceeds to step 235 where the current instruction is traced within the trace stream using a special type of atom that captures all of the required information about the current instruction and the target address. In particular, that atom will identify the address of the current instruction, and the target address that is branched to. In one embodiment, a pre-existing type of atom used for capturing information about exceptions occurring during instruction execution within the processing element 50 can be used for this purpose. It will be appreciated that the atom and associated information issued at step 235 is expensive in terms of trace bandwidth when compared with the atoms issued at steps 215 and 225, but will only need to be issued in instances where the trace BTAC has been unable to capture information about the relevant branch-future instruction. Following step 235, the process then returns to step 200.

If at step 230 it is determined that the current instruction does not cause the processing element to change its program counter because of a hit in the processing element's BTAC 55, then at step 240 it is determined whether the current instruction preloads the processing element BTAC 55, i.e. whether the current instruction is one of the earlier-mentioned branch-future instructions. If so, then at step 245 an entry within the trace BTAC 75 is allocated, and the source address field 165 and direct/indirect field 170 are populated using information derived from the instruction execution information forwarded from the processing element. The process then returns to step 200.

Whilst in one embodiment the trace BTAC 75 takes the form shown in FIG. 4B, and hence at step 245 both the source address and the direct/indirect target address information are captured within the fields 165, 170, in one embodiment it is possible for the source address field 165 to be removed, and only the direct/indirect target address field 170 to be maintained with the trace BTAC. In particular, if the processing element BTAC 55 only has a single entry, and hence can only store information about a single branch-future instruction, if the instruction execution information forwarded from the processing element 50 indicates that there has been a hit in its local BTAC 55, the trace generation circuitry 60 may be able to infer that an entry it is maintaining in its trace BTAC 75 is for that same branch-future instruction, and hence can directly use the direct/indirect target address information 170 without needing to perform any source address check.

FIG. 6 is a flow diagram illustrating a process performed by the decompressor circuitry 100 of FIG. 3 in accordance with one embodiment. At step 300, it is determined whether an atom has been received in the trace stream at the input interface 105. Once an atom has been received, then at step 305 the decompressor circuitry 100 begins to traverse the program image 110 from a current address. At a trace start point, or at a synchronisation point within the tracing activities, the current address may be set to a specified value. Thereafter, it will be updated based on the program traversal operation performed by the decompressor circuitry, as will be apparent from the further discussion of FIG. 6 below.

At step 310, the details of the current instruction are output to the analysis circuitry 120, and at step 315 it is determined with reference to the program image whether the current instruction (i.e. the instruction pointed to by the current address) is an instruction which preloads the processing element's BTAC 55, i.e. is one of the aforementioned branch-future instructions. If it is, then the process proceeds to step 320 where the decompressor circuitry 100 allocates an entry in its decompressor BTAC 115 and stores within that entry as a source address the address of the instruction identified by the branch-future instruction. In addition, it stores within that entry the target address if that is calculable directly from the current instruction, i.e. the branch-future instruction. The process then proceeds to step 335 where the next instruction in the program image is set to be the current instruction (by advancing the address to point to the next instruction in the program image), and the process returns to step 310.

If it is determined at step 315 that the current instruction is not a branch-future instruction, then at step 325 it is determined whether the address of the current instruction matches a source address stored in the decompressor BTAC 115. If so, then this indicates that the current instruction is an identified instruction that has been identified by a previously executed branch-future instruction, and accordingly should be treated as an instruction that causes the program image traversal process to stop, in the same way as a P0 instruction would. Accordingly, the process proceeds to step 340 where the current address maintained by the decompressor circuitry is updated to the target address. This will either be available directly from the decompressor BTAC entry in the event that the target address was a direct target address, or will be available from information provided in the trace stream if the target address is an indirect target address. At step 345, the process stops traversing the program image, and the process returns to step 300 to await the next atom.

If it is determined at step 325 that the address of the current instruction does not match a source address held in the decompressor BTAC, then it is determined at step 330 whether the current instruction in the program image is a standard P0 instruction, for example a branch instruction. If so, the process again proceeds to step 340, whereas otherwise the process continues to step 335.

By such an approach, it can be seen that the program image is traversed as each atom is received, with each atom either being associated with a standard P0 instruction, or being associated with an instruction identified by a branch-future instruction. Due to the use of the decompressor BTAC 115 which is populated in the manner described with reference to FIG. 6, it is possible for the decompressor circuitry 100 to interpret the trace stream correctly, and in particular to determine accurately when to stop traversing the program image in response to each atom, hence enabling the branches in instruction flow to be correctly tracked irrespective of whether they are due to branch instructions or other instructions that the branch-future instructions have arbitrarily converted into a branch.

FIG. 7 is a flow diagram illustrating the operation of the trace module 20 of FIG. 2 in accordance with an alternative embodiment where a trace BTAC 75 is not required.

At step 400, the trace generation circuitry accumulates the instruction execution information passed to it from the processing element until that information includes an indication that a branch has been handled by the processing element. In one embodiment, the processing element may provide the instruction execution information as each instruction is executed by the processing element. However, in an alternative embodiment where a waypoint interface is maintained between the processing element 50 and the trace module 20 (a waypoint interface implying the execution of instructions by providing the target address of the previous branch with the address of the next branch being maintained between the processing element 50 and the trace module 20), the processing element may itself buffer up the required instruction execution information until such point as a branch has been handled, and then will provide all of that instruction execution information in one batch to the trace module 20.

At step 405 it is determined whether the information provided from the processing element indicates that a branch-future instruction was executed before the branch. If so, then at step 410 it is determined whether the information from the processing element also indicates that the branch that took place was due to a hit in the processing element's BTAC 55, i.e. was due to the processing element encountering the instruction that was identified by the executed branch-future instruction. If so, then the process proceeds to step 415 where an E atom is issued within the trace stream to represent the BTAC hit branch to the target address. If the target address is directly determinable from the branch-future instruction, then no further information is needed in addition to the E atom, but if the target address is indirect, then the trace generation circuitry 60 also determines the target address from the instruction execution information provided by the processing element 50, and that target address is forwarded in association with the E atom within the trace stream. Thereafter, at step 445, the instruction execution information currently held by the trace module 20 is cleared, and the process returns to step 400.

If at step 410 it is determined that the branch was not due to a hit in the processing element BTAC, even though it was determined at step 405 that the information provided by the processing element indicated that a branch-future instruction was executed before the branch, then the process proceeds to step 420. At this point, the trace generation circuitry 60 issues an N atom for the BTAC-based branch, to flag that a BTAC-based branch did not occur, and then in addition issues an atom to identify the normal branch that then took place. As discussed earlier, this atom will be an E atom or an N atom dependent on the taken/not taken behaviour of that branch instruction, as determined from the instruction execution information provided by the processing element 50. Following step 420, the processing then proceeds to step 445.

If at step 405 it is determined that the information from the processing element does not indicate that a branch-future instruction was executed before the branch, the process proceeds to step 425, where it is determined whether it is actually known from the instruction execution information if a branch-future instruction was or was not executed. If it is known from that information that a branch-future instruction was not executed, then the process proceeds to step 430 where an atom is issued for the normal branch that has occurred, this being either an E atom or an N atom dependent on the taken/not taken information in the instruction execution information.

However, in embodiments where only certain portions of the instruction sequence executed by the processing element are subjected to trace, it is possible that the trace module may not definitively know whether a branch-future instruction has been executed or not. In that event, the "yes" path from step 425 is followed, where at step 435 it is then determined whether the information provided by the processing element indicates that a branch was nevertheless due to a BTAC hit in the processing element BTAC 55. If it does, then the process proceeds to step 440 where the earlier-mentioned "exception style" atom is issued that includes all of the required information about the branch event that has occurred. In particular, that atom will include the address of the instruction that caused the branch to take place, and also the target that was branched to.

If the information from the processing element indicates the branch was not due to a BTAC hit, i.e. was due to a normal branch, then the process proceeds from step 435 to step 430. Following steps 430 or 440, the process then proceeds to step 445.

In such an embodiment as discussed with reference to FIG. 7, it will hence be appreciated that it is possible to operate the system without a trace BTAC 75 associated with the trace generation circuitry. Instead, the trace generation circuitry operates using information provided to it from the processing element 50 indicative of BTAC hits that have occurred within the processing element BTAC 55, and generates trace elements accordingly. It should be noted that when adopting the approach of FIG. 7, the trace analyser 40 will still include a decompressor BTAC 115, and the decompressor circuitry 100 will still operate in the manner discussed with reference to FIG. 6.

FIG. 8 is a flow diagram illustrating the operation of the trace module 20 in accordance with a yet further alternative embodiment. In this embodiment, the trace module 20 does not have the earlier described trace BTAC 75, but does have a simple storage element 78 maintaining a field (which in one embodiment could be a single bit) that is set and cleared in the manner described in FIG. 8. Steps 500 and 505 of FIG. 8 correspond to steps 200 and 205 of the earlier described FIG. 5, and steps 510 and 515 correspond to steps 220 and 225 of FIG. 5. Since in this embodiment the trace module does not have its own BTAC 75, steps 210 and 215 of FIG. 5 are not replicated in FIG. 8, and instead the "yes" path from step 505 proceeds directly to step 510. If the process proceeds to step 515 to cause an atom to be issued for the current instruction, then at step 520 the storage element 78 in the trace module is cleared, prior to the process returning to step 500.

If at step 510 it is determined that the current instruction is not a standard PO instruction, then the process proceeds to step 525, which corresponds to step 230 of FIG. 5. If at step 525 it is determined that the current instruction does cause the processing element 50 to change its program counter because of a hit in its local BTAC 55, then at step 530 it is determined whether the storage element 78 in the trace module is set. If it is, then at step 535 the current instruction is treated as a P0 instruction and accordingly an atom is issued in the trace stream, step 535 essentially corresponding to step 215 of FIG. 5. Thereafter, at step 540, the storage element in the trace module is cleared, prior to the process returning to step 500.

If at step 530 it is determined that the storage element 78 is not set, then the process proceeds to step 545, which corresponds to step 235 of FIG. 5, causing an "exception-style" atom to be issued prior to the process returning to step 500.

If at step 525, it is determined that the current instruction does not cause the processing element to change its program counter because of a hit in the BTAC 55, then at step 550 it is determined whether the current instruction is a branch-future instruction, and hence causes the processing element 50 to allocate an entry in the processing element's BTAC 55. If so, then at step 555 the bit in the storage element 78 is set, prior to the process returning to step 500, whereas if the "no" path is followed from step 550, the process merely returns directly to step 500.

In one embodiment, the storage element 78 merely maintains the single bit discussed earlier, which is set and cleared in the manner discussed in FIG. 8. In that event, the instruction execution information forwarded to the trace module 20 from the processing element 50 can be arranged to indicate whether the target address for the branch that occurs when the identified instruction is encountered by the processing circuitry is directly derivable from an immediate value specified within the branch-future instruction or not. In the same way as discussed earlier with reference to step 215 of FIG. 5, if when issuing an E atom at step 535 it is determined that the target address is not directly derivable, then the trace generation circuitry will determine the target address from the instruction execution information provided by the processing element 50, and an indication of that target address will follow the E atom within the trace stream so that that target address is later available to the trace analyser 40.

In an alternative embodiment, at step 555 the storage element may optionally maintain the direct/indirect indication in the same way as described earlier for the field 170 of the trace BTAC 75, and that information can be referred to by the trace module 20 when deciding whether the target address is direct or indirect, and hence whether an indication of the target address needs to be output in the trace stream or not.

From the above described embodiments, it will be appreciated that execution of a branch-future instruction enables a branch behaviour to be associated with the identified instruction that causes the processing circuitry to branch to a target address identified by the branch-future instruction when the identified instruction is encountered in the sequence. The trace mechanisms described enable such branch behaviour activity to be traced, so that the trace analyser can correctly determine the instruction flow executed by the processing circuitry.

The branch-future instruction described in the above embodiments is able to identify any arbitrary instruction that will be encountered later in the instruction sequence as the instruction which will cause the branch to the target address to take place. However, another form of instruction which can be considered as a branch-future instruction for which the above described techniques could be employed is a loop-end instruction at a finish of a program loop body, where that loop-end instruction identifies, as the identified instruction, an immediately preceding instruction within the program loop body, and the target address is an address of an instruction at a start of the program loop body. Although the identified instruction will in this case first appear before the loop-end instruction, due to the nature of the program loop it will also be encountered a number of further times later in the instruction sequence as the further iterations of the loop are performed. Hence, the trace generation unit can be arranged to issue a trace element indicating that a branch has been triggered each time the instruction execution information subsequently indicates that a branch has occurred due to said immediately preceding instruction being encountered at a time where branch control information for said immediately preceding instruction is stored within the processing element's branch control cache.

Such a loop-end instruction can be used to implement a so-called "zero overhead loop", where the loop-end instruction (which may be referred to as a zero overhead loop end (ZOLE) instruction) does not need to be executed during each iteration of the loop, and instead, following the first iteration, the required branching for further iterations can be triggered when encountering the penultimate instruction in the program loop body. By causing the trace generation unit to generate trace elements in the manner described above, this enables an analysis circuitry to correctly track the processing circuitry's execution of such a zero-overhead loop.

The embodiments described herein enable a very efficient tracing mechanism to be implemented where trace elements are only produced for a (typically small) subset of the instructions that are actually executed by the monitored circuitry, but which can accurately trace the activities of the monitored circuitry even when the monitored circuitry executes an instruction sequence that includes one or more branch-future instructions, that can effectively convert any arbitrary instruction into a branch.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
an input interface to receive instruction execution information from processing circuitry indicative of a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes execution of the identified instruction to be prevented and instead causes the processing circuitry to branch to a target address identified by the branch-future instruction irrespective of a form of the identified instruction;
trace generation circuitry to generate from the instruction execution information a trace stream comprising a plurality of trace elements indicative of execution by the processing circuitry of predetermined instructions within said sequence; and
a branch control cache to store branch control information derived from said branch-future instruction;
the trace generation circuitry being arranged to detect, based on the branch control information stored in the branch control cache, when the identified instruction has been encountered by the processing circuitry, and then issue within the trace stream a trace element to indicate that a branch to the target address has occurred.

2. An apparatus as claimed in claim 1, wherein the branch control cache is associated with the trace generation circuitry and the trace generation circuitry is arranged to store the branch control information dependent on the instruction execution information received from the processing circuitry.

3. An apparatus as claimed in claim 2, wherein, when the instruction execution information indicates that the branch-future instruction has been executed by the processing circuitry, the trace generation circuitry is arranged to store, within the branch control cache, branch point data identified by the branch-future instruction and used to determine said identified instruction.

4. An apparatus as claimed in claim 3, wherein the trace generation circuitry is arranged to reference the branch point data stored in the branch control cache in order to detect, from the received instruction execution information, when the identified instruction has been encountered by the processing circuitry, and upon said detection then issue within the trace stream said trace element to indicate that a branch to the target address has occurred.

5. An apparatus as claimed in claim 3, wherein said branch point data comprises one or more of:
address data indicative of an address of said identified instruction;
end data indicative of an address of a last instruction that immediately precedes said identified instruction;
offset data indicative of a distance between said branch-future instruction and said identified instruction;
a proper subset of bits indicative of a memory storage address of said identified instruction starting from a least significant bit end of bits of said memory storage address that distinguish between starting storage addresses of instructions;

remaining size instruction data indicative of a number of instructions remaining to be processed before said identified instruction; and remaining size data indicative of a number of program storage locations remaining to be processed before said identified instruction is reached.

6. An apparatus as claimed in claim 2, wherein, when the instruction execution information indicates that the branch-future instruction has been executed by the processing circuitry, the trace generation circuitry is arranged to store, within the branch control cache, a target indicator indicating whether the target address is directly derivable from an immediate value specified within said branch-future instruction.

7. An apparatus as claimed in claim 6, wherein when the target indicator indicates that the target address is not directly derivable from the immediate value, the trace generation circuitry is arranged to issue within the trace stream, in association with the trace element to indicate that a branch to the target address has occurred, an indication of the target address derived from the instruction execution information received from the processing circuitry.

8. An apparatus as claimed in claim 2, wherein:
the trace generation circuitry is arranged to produce the trace stream that is indicative of a portion of the sequence of instructions executed by the processing circuitry, the trace elements pertaining to the predetermined instructions contained within said portion; and
the trace generation circuitry is arranged to store the branch control information within the branch control cache only when the branch-future instruction is within said portion of the sequence of instructions.

9. An apparatus as claimed in claim 2, wherein the branch control cache is separate to a processing circuitry branch control cache that maintains the branch control information used by the processing circuitry to cause the processing circuitry to branch to the target address identified by the branch-future instruction when said identified instruction is encountered by the processing circuitry following execution of the branch-future instruction.

10. An apparatus as claimed in claim 9, wherein the processing circuitry branch control cache enables only branch control information derived from a single branch-future instruction to be stored, and the branch control cache associated with the trace generation circuitry is arranged to store a target indicator indicating whether the target address is directly derivable from an immediate value specified within said single branch-future instruction, but not to store branch point data identified by the branch-future instruction and used to determine said identified instruction.

11. An apparatus as claimed in claim 9, wherein:
the trace generation circuitry is arranged to produce the trace stream that is indicative of a portion of the sequence of instructions executed by the processing circuitry, the trace elements pertaining to the predetermined instructions contained within said portion;
the trace generation circuitry is arranged to store the branch control information within the branch control cache only when the branch-future instruction is within said portion of the sequence of instructions; and
the trace generation circuitry is responsive to the instruction execution information indicating that the processing circuitry has branched to the target address due to encountering a given instruction within said sequence having associated branch control information in the processing circuitry branch control cache, but the branch control cache associated with the trace generation circuitry has no branch control information stored for said given instruction, to issue a trace element to identify both said given instruction and the branch that has been taken on encountering said given instruction.

12. An apparatus as claimed in claim 2, wherein the trace generation circuitry is arranged to invalidate the branch control information in the branch control cache on occurrence of a predetermined trace control event.

13. An apparatus as claimed in claim 1, wherein:
the branch control cache is associated with the processing circuitry and used to maintain the branch control information used by the processing circuitry to cause the processing circuitry to branch to the target address identified by the branch-future instruction when said identified instruction is encountered by the processing circuitry following execution of the branch-future instruction; and
the instruction execution information includes an indication when a branch-future instruction was executed by the processing circuitry, an indication when a branch has been handled by the processing circuitry, and an indication as to whether the handling of said branch was due to the branch control information maintained within the branch control cache rather than due to execution of a branch instruction; and
the trace generation circuitry is arranged to determine the trace elements to be generated based on the indications within the instruction execution information.

14. An apparatus as claimed in claim 13, wherein, when the instruction execution information indicates that a branch-future instruction has been executed and a next branch that occurred was due to the branch control information, the trace generation circuitry is arranged to generate said trace element to indicate that a branch to the target address has occurred.

15. An apparatus as claimed in claim 13, wherein, when the instruction execution information indicates that the branch has been handled due to execution of a branch instruction and was not preceded by execution of the branch-future instruction, the trace generation circuitry is arranged to issue a trace element whose type indicates whether the branch that has been handled was taken or not taken by the processing circuitry.

16. An apparatus as claimed in claim 13, wherein, when the instruction execution information indicates that the branch has been handled due to execution of a branch instruction but was preceded by execution of the branch-future instruction, the trace generation circuitry is arranged to generate a first trace element indicating that the branch to the target address has not occurred and a second trace element whose type indicates whether the branch that has been handled due to execution of the branch instruction was taken or not taken by the processing circuitry.

17. An apparatus as claimed in claim 13, wherein, when the instruction execution information indicates that the branch to the target address occurred due to the branch control information, but it is not known by the trace generation circuitry whether a preceding branch-future instruction was executed by the processing circuitry, the trace generation circuitry is arranged to issue a trace element to identify both the identified instruction and the branch to the target address that has been taken on encountering said identified instruction.

18. An apparatus as claimed in claim 1, wherein:
the branch control cache is associated with the processing circuitry and used to maintain branch control information used by the processing circuitry to cause the processing circuitry to branch to the target address identified by the branch-future instruction when said identified instruction is encountered by the processing circuitry following execution of the branch-future instruction;

the trace generation circuitry has a storage element which is set when the instruction execution information indicates that the branch-future instruction has been executed by the processing circuitry; and when the instruction execution information indicates that the processing circuitry has branched to the target address due to encountering an identified instruction having associated branch control information in the branch control cache, and the storage element is set, the trace generation circuitry is arranged to then issue within the trace stream a trace element to indicate that the branch to the target address has occurred and is further arranged to clear the storage element.

19. An apparatus as claimed in claim 18, wherein when the instruction execution information indicates that the processing circuitry has branched to the target address due to encountering a given instruction within said sequence having associated branch control information in the branch control cache, and the storage element is not set, the trace generation circuitry is arranged to issue a trace element to identify both said given instruction and the branch that has been taken on encountering said given instruction.

20. An apparatus as claimed in claim 18, wherein, when the instruction execution information indicates that a branch has been handled due to execution of a branch instruction, the trace generation circuitry is arranged to issue a trace element whose type indicates whether the branch was taken or not taken by the processing circuitry, and is further arranged to clear the storage element.

21. An apparatus, comprising:
an input interface to receive a trace stream comprising a plurality of trace elements indicative of execution by processing circuitry of predetermined instructions within a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes the execution of the identified instruction to be prevented and instead causes the processing circuitry to branch to a target address identified by the branch-future instruction irrespective of a form of the identified instruction;
decompression circuitry, responsive to each trace element, to traverse a program image from a current instruction address until a next one of the predetermined instructions is detected within said program image, and to produce from the program image information indicative of the instructions between said current instruction address and said next one of the predetermined instructions; and
a branch control cache associated with said decompression circuitry;
the decompression circuitry being responsive to detecting the branch-future instruction when traversing said program image, to store within the branch control cache branch control information derived from the branch-future instruction;
the decompression circuitry being arranged, when detecting with reference to the branch control information that the identified instruction has been reached during traversal of the program image, to treat said identified instruction as the next one of said predetermined instructions.

22. An apparatus as claimed in claim 21, wherein the decompression circuitry is arranged to store as the branch control information branch point data identified by the branch-future instruction and used to determine said identified instruction.

23. An apparatus as claimed in claim 22, wherein the decompression circuitry is further arranged to store as the branch control information the target address when said target address is directly derivable from an immediate value specified within said branch-future instruction.

24. A method of generating a trace stream indicative of instruction execution by processing circuitry, comprising:
receiving instruction execution information from the processing circuitry indicative of a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes execution of the identified instruction to be prevented and instead causes the processing circuitry to branch to a target address identified by the branch-future instruction irrespective of a form of the identified instruction;
generating from the instruction execution information the trace stream comprising a plurality of trace elements indicative of execution by the processing circuitry of predetermined instructions within said sequence;
storing, in a branch control cache, branch control information derived from said branch-future instruction; and
detecting, based on the branch control information stored in the branch control cache, when the identified instruction has been encountered by the processing circuitry, and then issuing within the trace stream a trace element to indicate that a branch to the target address has occurred.

25. An apparatus, comprising:
input interface means for receiving instruction execution information from processing circuitry indicative of a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes execution of the identified instruction to be prevented and instead causes the processing circuitry to branch to a target address identified by the branch-future instruction irrespective of a form of the identified instruction;
trace generation means for generating from the instruction execution information a trace stream comprising a plurality of trace elements indicative of execution by the processing circuitry of predetermined instructions within said sequence; and
branch control cache means for storing branch control information derived from said branch-future instruction;
the trace generation means for detecting, based on the branch control information stored in the branch control cache means, when the identified instruction has been encountered by the processing circuitry, and then issuing within the trace stream a trace element to indicate that a branch to the target address has occurred.

26. A method of processing a trace stream generated to indicate instruction execution by processing circuitry, comprising:
   receiving the trace stream comprising a plurality of trace elements indicative of execution by the processing circuitry of predetermined instructions within a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes execution of the identified instruction to be prevented and instead causes the processing circuitry to branch to a target address identified by the branch-future instruction irrespective of a form of the identified instruction;
   traversing, responsive to each trace element, a program image from a current instruction address until a next one of the predetermined instructions is detected within said program image, and producing from the program image information indicative of the instructions between said current instruction address and said next one of the predetermined instructions;
   responsive to detecting the branch-future instruction when traversing said program image, storing within a branch control cache branch control information derived from the branch-future instruction; and
   when detecting with reference to the branch control information that the identified instruction has been reached during traversal of the program image, treating said identified instruction as the next one of said predetermined instructions.

27. An apparatus, comprising:
   an input interface means for receiving a trace stream comprising a plurality of trace elements indicative of execution by processing circuitry of predetermined instructions within a sequence of instructions executed by the processing circuitry, said sequence including a branch-future instruction that indicates an identified instruction following said branch-future instruction within said sequence, execution of the branch-future instruction being such that subsequent encountering of said identified instruction in said sequence by the processing circuitry causes execution of the identified instruction to be prevented and instead causes the processing circuitry to branch to a target address identified by the branch-future instruction irrespective of a form of the identified instruction;
   decompression means for traversing, responsive to each trace element, a program image from a current instruction address until a next one of the predetermined instructions is detected within said program image, and for producing from the program image information indicative of the instructions between said current instruction address and said next one of the predetermined instructions; and
   branch control cache means for association with said decompression means;
   the decompression means, responsive to detecting the branch-future instruction when traversing said program image, for storing within the branch control cache means branch control information derived from the branch-future instruction;
   the decompression means, when detecting with reference to the branch control information that the identified instruction has been reached during traversal of the program image, for treating said identified instruction as the next one of said predetermined instructions.

\* \* \* \* \*